United States Patent [19]
Comroe et al.

[11] Patent Number: 5,870,149
[45] Date of Patent: Feb. 9, 1999

[54] VIDEO/INTEGRATED LAND MOBILE DISPATCH RADIO AND VIDEO UNIT

[75] Inventors: Richard Alan Comroe, Dundee; Robert William Furtaw, Lake Zurich; Arun Sobti, South Barrington; John Edward Major, Barrington, all of Ill.

[73] Assignee: Motorola, Inc., Schaumburg, Ill.

[21] Appl. No.: 30,937

[22] Filed: Mar. 12, 1993

[51] Int. Cl.⁶ .................................................. H04N 7/18
[52] U.S. Cl. ........................ 348/474; 348/14; 348/22
[58] Field of Search ........................ 358/93, 108, 909; 320/20; 348/14, 723, 705, 706, 259, 22, 474, 13; H04N 7/18

[56] References Cited

U.S. PATENT DOCUMENTS

| | | | |
|---|---|---|---|
| 4,258,387 | 3/1981 | Lemelson et al. | 348/14 |
| 4,317,130 | 2/1982 | Brown | 358/108 |
| 4,485,400 | 11/1984 | Lemelson et al. | 348/14 |
| 4,684,870 | 8/1987 | George et al. | 320/20 |
| 4,884,132 | 11/1989 | Morris et al. | 358/108 |
| 4,985,755 | 1/1991 | Shimoda et al. | 348/239 |
| 5,305,105 | 4/1994 | Heo | 348/705 |

*Primary Examiner*—Richard Lee
*Attorney, Agent, or Firm*—Steven G. Parmelee; Susan L. Lukasik

[57] ABSTRACT

An integrated land mobile dispatch radio capable of accommodating both standard audio transmissions and video transmissions. The push-to-talk switch controls these activities. Video images can be stored and reviewed prior to transmission. Also, video transmissions can be interrupted to accommodate a current need to conduct an audio transmission.

17 Claims, 4 Drawing Sheets

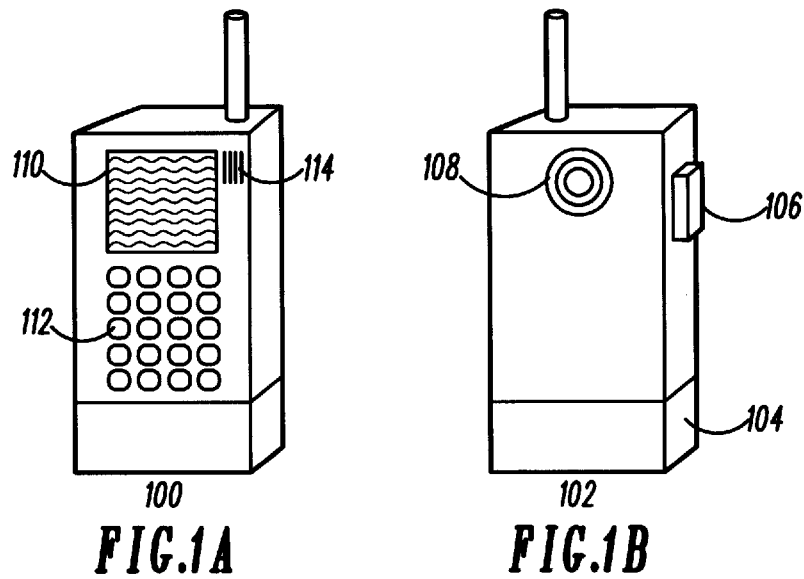
FIG.1A    FIG.1B
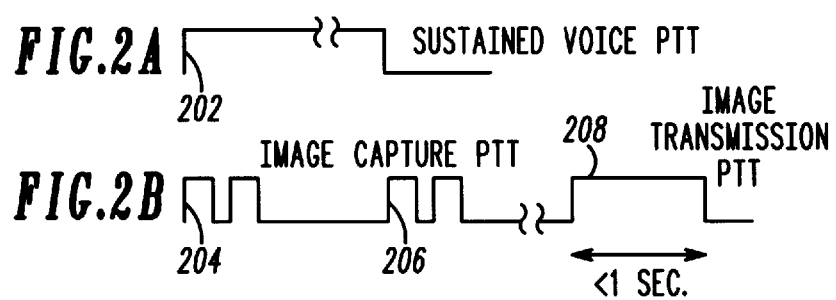

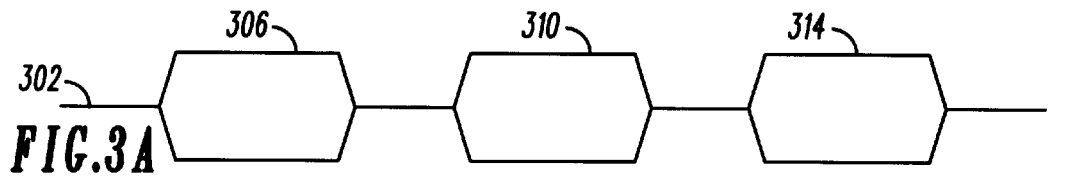
FIG.3A  VIDEO TRANSMISSION PACKETS
FIG.3B  VIDEO TRANSMISSION PACKET ACKNOWLEDGEMENTS
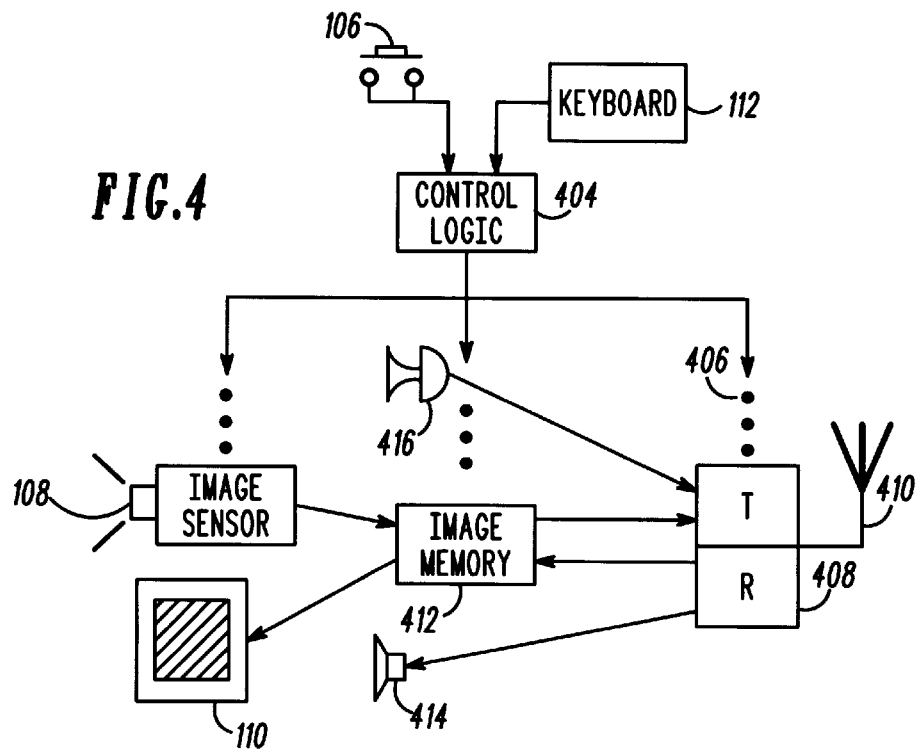
FIG.4

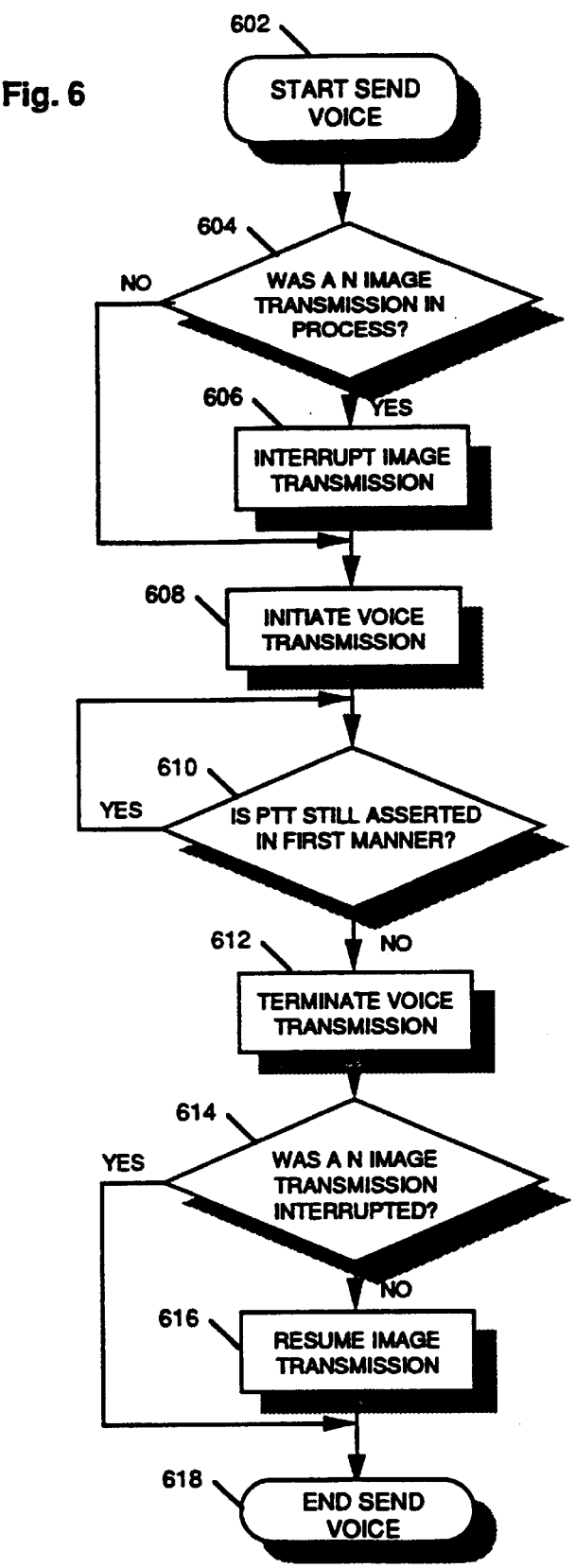

VIDEO/INTEGRATED LAND MOBILE DISPATCH RADIO AND VIDEO UNIT

TECHNICAL FEILD

This invention relates generally to communication systems, including but not limited to land mobile dispatch radio.

BACKGROUND OF THE INVENTION

The basic operation and structure of land mobile dispatch radio systems is known. Land mobile dispatch radio systems typically comprise one or more radio communication units and one or more repeaters that transceive information via communications channels. These communications channels typically reside on narrow bandwidths of 12.5 kHz, 25 kHz, or 30 kHz spaced channels. Further, within these narrow spaced channels, transmission and reception occurs within an even more narrow passband, such as 15 kHz. Such land mobile radio dispatch systems typically employ frequency modulation to convey speech signals.

In order to understand the embodiment described herein, it will be helpful to the reader to first understand the difference between a dispatch radio environment and other radio environments, such as a radio telephony operating environment. Unlike radio telephony systems, where a user establishes contact with another party by inputting a unique ID code (such as a telephone number) that specifically identifies the party to be called, dispatch services do not require the originating party to enter any particular ID code. Instead, dispatch radios are pre-programmed to automatically identify their transmissions as being intended for reception by members of a particularly pre-identified fleet. The user need only actuate a push-to-talk (PTT) switch on the radio and begin speaking. The radio, in response to enablement of the PTT switch, will automatically signal that a communication for the members of the previously defined group is being made, and the radio dispatch system will accommodate that circumstance.

Video transmission systems are also known. Audio and video transmissions are typically broadcast one-way to one or more receiving units. Typical channels are spaced by 6MHz. Within the typical channel, the standard method is to convey the intensity of the moving electron beam using amplitude modulation (the electron beam intensity corresponds to the darkness of the picture at a moving spot on the video image). The moving spot traverses the image in rows across the screen from top to bottom, at approximately 30 or 60 times a second. The rate of row advancement is typically 15 kHz. As a net effect, this AM modulated luminance signal typically occupies several MHz of bandwidth within a 6 MHz spaced channel. The video channel also usually carries audio on an FM carrier within the channel.

Therefore, standard video transmissions are not compatible with standard land mobile dispatch communications channels due to increased spectrum requirements.

Various video bandwidth compression techniques are known. The best known techniques involve taking a single frame of a full motion video, and transmitting it using what is commonly called slow scan technology. Similar methods are employed for the digitization and compressed transmission of scanned printed material, commonly called FAX. Both slow scan and FAX have been demonstrated over land mobile dispatch radio channels using video cameras and FAX machines connected to existing land mobile dispatch radio units through adapters.

Using land mobile dispatch radio to serve video needs is desirable. To date, however, using a land mobile dispatch radio as a video modem typically dedicates the radio to this service, thus precluding the radio's primary function; the provision of voice connectivity. Further, external video equipment coupled to the radio usually hinders the user's mobility.

Therefore, a need exists for a method of integrating total communications capabilities including audio, video imaging, and imaging display capabilities into a single land mobile dispatch radio system that will not substantially detract from the portability or utility of the communications unit, while maintaining compatibility with existing land mobile dispatch radio channels.

SUMMARY OF THE INVENTION

This need and others are substantially met through provision of the video/integrated land mobile dispatch radio and video unit disclosed herein. This unit provides, in an integrated structure, a radio transceiver for transceiving dispatch RF communications. In one embodiment, these communications occur on existing land mobile dispatch radio channels. The unit includes a control mechanism, in one embodiment a push-to-talk (PTT) switch, to allow the user to transmit voice information, or to select and/or store, display, or transmit video information captured by a video input device located within the unit.

BRIEF DESCRIPTION OF THE DRAWINGS

FIGS. 1A and 1B illustrates an integrated video and audio communications unit capable of operating in a land mobile dispatch radio system in accordance with the invention.

FIGS. 2A and 2B illustrates a timing diagram for single PTT key control of video capture and transmission in accordance with the invention.

FIGS. 3A and 3B illustrates a packetized transmission of video images in accordance with the invention.

FIG. 4 illustrates a block diagram of the communications unit depicted in FIG. 1 and in accordance with the invention.

FIG. 6 illustrates a flow chart for voice transmission of the communications unit in accordance with the invention.

DESCRIPTION OF A PREFERRED EMBODIMENT

Figure 5:
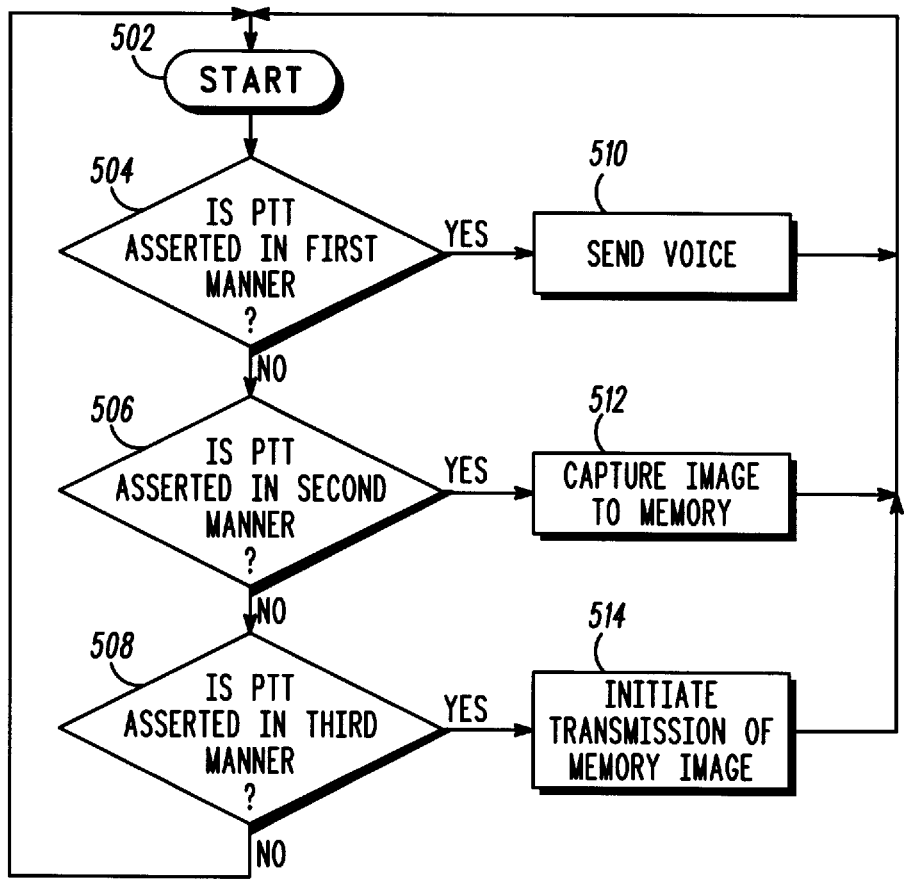
FIG. 5 illustrates a flow chart for single PTT key control of the communications unit in accordance with the invention.

FIGS. 1A and 1B illustrate an integrated dispatch radio communications unit, showing front view (100) (FIG. 1A) and back view (102) (FIG. 1B). Like typical portable communication units, this unit contains a battery compartment, or battery unit (104). As is customary in land mobile dispatch radio, a single push button bar (106) functions as an actuator (106), normally called the Push-To-Talk (PTT). An electronic image sensor, such as a Charge-Coupled-Device (CCD) is located high on the back of the unit (108), such that it will not normally be occluded by a hand holding the unit. On the front of the unit is a flat electronic display, such as a Liquid Crystal Display (LCD) (110). Also on the front of the unit is a key-pad (112) to allow input of user instructions or data. Finally, the front of the housing will have a microphone opening, with the microphone located behind the opening (114). A speaker would likewise be mounted inside the housing.

The block diagram of this communications unit is depicted in FIG. 4. The unit consists of a radio transceiver (408) coupled to an antenna (410), and to audio input and output devices (I/O) such as the microphone (416) and speaker (414). The unit also contains an image memory means (412) coupled to the transceiver (408) and image I/O including a sensor (108) and a display (110). The PTT button (106) couples to control logic (404), which in turn couples to all the other elements in the communications unit by control lines (406).

The integrated radio communications unit maintains the primary operation of the radio as a voice communications device. The keypad (112) supports talkgroup and/or system selections, and the video display (110) supports display of system/talk-group selections. The PTT (106) may be asserted in a first manner to initiate voice transmission (202) (FIG. 2A), and the radio speaker annunciates received speech from other radio units or a dispatcher. Such first manner of asserting the PTT is typically sustained holding of the switch for the duration of the desired voice transmission.

Similarly, the integrated radio communications unit can, in a particular application, support prior art telephone interconnect operation whereby the keypad serves as the dialing device, and the video display provides a dialing display.

Through a second manner of assertion of the PTT the user may display video images captured from the CCD (108) onto the video display (110). This permits the user to select and preview a desired image prior to transmission. Such second manner of asserting the PTT may be accomplished by quick double clicking (204) (FIG. 2B) within a predetermined allotted time window, or, in the alternative, by half pressure pressing of the key.

A captured image may be replaced with a new image by repeating the second manner of assertion (106). A user initiates transmission of a captured image by a third manner of asserting the PTT, which could be a short, single PTT depression (208). Once the third manner of asserting the PTT has been sensed following capture of a still image, the communications unit would perform image compression of the still image and begin transmission of the image over the radio channel.

In a preferred embodiment, a sustained PTT of greater than 1 second (as an example of the first manner of asserting the PTT) automatically reverts the radio to normal PTT voice transmission as shown in FIG. 2A. Also, whenever the user is not displaying a captured video image in the recent past, such as within the last 5 to 10 seconds, the video display would revert to a status display, and the next first manner of asserting the PTT would immediately be interpreted as normal voice PTT as in FIG. 2A.

Once a transmission of a compressed video signal has been initiated, it is conducted between the communications unit and base using a packet transmission protocol as shown in FIGS. 3A and 3B.

On the communications unit transmit channel (302), the compressed video image is transmitted in sequential packets (306, 310, and 314) (The exact number of packets would of course vary from application to application). Transmission of each packet is terminated to await reception of an acknowledgement from the base (308, 312, 316) on the receive channel (308). A suitable retransmission request strategy may be coupled with forward error correction and detection techniques to maximize the throughput of video image packets over the radio channel.

Also, such packetized transmission of compressed video images permits the user to interrupt the packet transmission process at any moment to transmit voice (sustained PTT), or to receive voice from the base end (via an acknowledgment packet instructing the communications unit to suspend packets until after a following voice reception terminates).

The operation of the communications unit is directed by the control logic (404 FIG. 4), which employs the logic functions illustrated by FIGS. 5 and 6 for sensing PTT assertion and transmission of voice and/or image.

FIG. 5 illustrates the flow chart for PTT sensing, beginning from a starting point (502). In the absence of sensing the PTT being asserted in a first, second, or third manner (504, 506, 508), the starting point is returned to such that the testing for PTT assertion may be performed again. If the PTT is found to be asserted in a first manner (504), then a control process to send voice is executed (510). If the PTT is found to be asserted in a second manner (506), then the current sensed image is stored in the image memory (512). If the PTT is found to be asserted in a third manner (508), then the transmission of the contents of the image memory is initiated (514). After transmission of voice (510), capturing an image to memory (512), or initiating transmission of a stored image (514), control continues back at the start (512) to sense the next PTT assertion.

FIG. 6 illustrates the send-voice process (510 from FIG. 5) in greater detail. The start point (602) is reached when assertion of the PTT is detected in a first manner. If an image transmission was in process at that moment (604), then that video transmission is interrupted (606). If no image transmission was in process, or following interruption of that process, then transmission of the microphone audible signals are commenced (608). This process is continued as long as the PTT remains asserted in the first manner (610). Once the PTT is no longer asserted in that first manner the transmission of the audible microphone input is suspended (612). If an image transmission was previously interrupted (614), then it is resumed (616). Following this, the process for sending voice ends (618) (510, in FIG. 5).

In existing dispatch service radios, given the extreme importance of the functionality served by the PTT switch in a dispatch operating environment, the PTT switch has ordinarily served only the one function of initiating a dispatch service voice communication. Some radios have allowed the PTT switch to effect other functions as well, provided the other-function capability is first specifically enabled by the user through manipulation of some other switch on the radio. For example, the STX radio as sold by Motorola, Inc. has a PTT switch that provides non-PTT functionality, provided the radio has first been placed in a status/message mode of operation by the user, hence intentionally redefining the operation of the radio. The dual functionality of the PTT switch in a land mobile dispatch radio as set forth in this Description of a Preferred Embodiment differs radically from these previous design restrictions. Notwithstanding this break with traditional design considerations as regards the sanctity of the PTT switch in a dispatch radio, the inventors have determined that the limited additional functionality provided here will not adversely interfere with operation of the basic dispatch functions that the radio must provide.

What is claimed is:

1. A two-way dispatch radio communication unit, comprising:

A) radio transceiver means for transceiving dispatch communications;

B) microphone means operably coupled to the radio transceiver means for providing audible messages to the radio transceiver means to allow transmission of the audible messages;

C) video input means operably coupled to the radio transceiver means for providing video information to the radio transceiver means to allow transmission of the video information;

D) control means operably coupled to the radio transceiver means, for controlling operation of the radio transceiver means in at least a first and second discrete mode of operation, wherein:
  i) in the first discrete mode of operation, the radio transceiver means transmits the audible messages; and
  ii) in the second discrete mode of operation, the radio transceiver means transmits the video information;

E) push-to-talk switch means operably coupled to the control means, for selecting the first and second discrete modes of operation.

2. The two-way dispatch radio communication unit of claim 1 wherein the radio transceiver means, the microphone means, the video input means, and the control means are integrally housed together.

3. The two-way dispatch radio communication unit of claim 1, and further including:
  F) speaker means operably coupled to the radio transceiver means for rendering received audio messages audible.

4. The two-way dispatch radio communication unit of claim 1, and further including:
  F) video display means operably coupled to the video input means for displaying a video depiction provided by the video input means.

5. The two-way dispatch radio communication unit of claim 1, and further including:
  F) display means operably coupled to the video input means and to the control means for selectively displaying:
    i) radio operating information;
    ii) a video depiction provided by the video input means.

6. The two-way dispatch radio communication unit of claim 1, and further including:
  F) memory means operably coupled to the video input means for storing at least one video image.

7. The two-way dispatch radio communication unit of claim 6, and further including:
  G) video display means operably coupled to the memory means for displaying the video image stored in the memory means.

8. The two-way dispatch radio communication unit of claim 7, wherein the memory means is operably coupled to the radio transceiver means, such that the radio transceiver means will selectively transmit the video image stored in the memory means.

9. The two-way dispatch radio communication unit of claim 8, such that the memory means selectively stores a video image received by the radio transceiver means.

10. The two-way dispatch radio communication unit of claim 9, wherein the video display means will further selectively display the video image received by the radio transceiver means.

11. A method of transmitting audio and video information, comprising the steps of:
  A) monitoring a push-to-talk switch;
  B) when the push-to-talk switch has been asserted in a first manner, transmitting audio information as input through a microphone;
  C) when the push-to-talk switch has been asserted in a second manner, which said second manner is different from the first manner, transmitting video information as input through a video input device.

12. A method of processing audio and video information using a push-to-talk switch, comprising the steps of:
  A) monitoring the push-to-talk switch;
  B) when the push-to-talk switch has been asserted in a first manner, transmitting via radio audio information as input through a microphone;
  C) when the push-to-talk switch has been asserted in a second manner, which said second manner is different from the first manner, storing a video image as input through a video input device.

13. A method of transmitting audio and video information, comprising the steps of:
  A) monitoring a push-to-talk switch;
  B) when the push-to-talk switch has been asserted in a first manner, transmitting via radio audio information as input through a microphone;
  C) when the push-to-talk switch has been asserted in a second manner, which said second manner is different from the first manner, storing a video image as input through a video input device;
  D) when the push-to-talk switch has been asserted in a third manner, which said third manner is at least different from the first manner, transmitting via RF the video image as previously stored.

14. A method of transmitting audio and video information, comprising the steps of:
  A) monitoring a push-to-talk switch;
  B) when the push-to-talk switch has been asserted in a first manner, transmitting via radio audio information as input through a microphone;
  C) when the push-to-talk switch has been asserted in a second manner, which said second manner is different from the first manner, storing a video image as input through a video input device;
  D) when the push-to-talk switch has been asserted in a third manner, which said third manner is at least different from the first manner, displaying the video image on a display device;
  E) when the push-to-talk switch has been asserted in a fourth manner, which said fourth manner is at least different from the first manner, transmitting via RF the video image as previously stored.

15. A method of transmitting audio and video information, comprising the steps of:
  A) monitoring a push-to-talk switch;
  B) while the push-to-talk switch is asserted in a first manner, transmitting audio information as input through a microphone;
  C) when the push-to-talk switch has been asserted in a second manner, which said second manner is different from the first manner, transmitting video information as input through a video input device unit until one of the following occurs:
    i) the video information is completely transmitted;
    ii) the push-to-talk switch is asserted in the first manner.

16. The method of claim 15, wherein step C$ii$ includes the step of transmitting audio information as input through a microphone.

17. The method of claim 16, wherein step C$ii$ further includes the step of resuming transmission of the video information when the push-to-talk switch is no longer asserted in the first manner.

* * * * *